Oct. 14, 1969 A. J. MONTEVECCHIO 3,472,953

GRAPHIC COMMUNICATION SYSTEM FOR TRANSMITTING REDUCED REDUNDANCY SIGNALS AT THE MAXIMUM RATE OF THE COMMUNICATION LINK

Filed March 17, 1966 2 Sheets-Sheet 1

INVENTOR.
ALBERT J. MONTEVECCHIO
BY Anthony D. Cennamo
Paul W. Fish
ATTORNEYS

INVENTOR.
ALBERT J. MONTEVECCHIO
BY Anthony D. Cennamo
Paul W. Fish
ATTORNEYS

United States Patent Office 3,472,953
Patented Oct. 14, 1969

3,472,953
GRAPHIC COMMUNICATION SYSTEM FOR TRANSMITTING REDUCED REDUNDANCY SIGNALS AT THE MAXIMUM RATE OF THE COMMUNICATION LINK

Albert J. Montevecchio, East Rochester, N.Y., assignor to Xerox Corporation, Rochester, N.Y., a corporation of New York Filed Mar. 17, 1966, Ser. No. 535,210
Int. Cl. H04n 1/32
U.S. Cl. 178—6.8 10 Claims

ABSTRACT OF THE DISCLOSURE

A graphic communication system for efficiently utilizing the bandwith capabilities of transmission networks interconnecting the transmitter and receiver of such systems. By scanning an original document for generating facsimile signals at a rate in excess of the bandwidth capabilities of the transmission media, a continuous coded stream of information, in which the signal redundancy has been considerably reduced, is available for transmission at a rate near the maximum rate compatible with the communication link regardless of the compression ratio for each individual line.

This invention relates to graphic communication systems and more particularly to methods and apparatus for efficiently utilizing the bandwidth capabilities of transmission networks interconnecting the transmitter and receiver of such systems.

As is shown in a normal facsimile system, a document to be transmitted is scanned at a transmitting station to convert information on the document into a series of electrical signals. These video signals or carrier modulated signals corresponding thereto are then coupled to the input of a communication link interconnecting the transmitter with a receiver. At the receiving station the video signals, in conjunction with suitable synchronizing signals, selectively control the actuation of appropriate marking means to generate a facsimile of the document transmitted.

A principal application of facsimile equipment is the transmission of printed or typewritten documents and letters. It is a distinguishing characteristic of such original documents that printing or typing is arranged in substantally horizontal lines. Examination of a typical letter, for example, will show that the lines of typing actually occupy considerably less than half the vertical dimension of the letter, the rest of this dimension being blank and corresponding to spaces between lines as well as blank spaces at the top and bottom of the letter. In a conventional facsimile system all parts of such a letter are normally scanned at a uniform rate. Assuming transmission over an ordinary telephone line, it may take in the order of six to fifteen minutes to transmit an ordinary letter with reasonable resolution. Considering the cost of the telephone service, such a long transmission time becomes a serious limitation on the economic usefulness of facsimile equipment.

The signal redundancy inherent in facsimile signals due, for example, to the margins and spacing between paragraphs of a letter and the attendant increased transmission cost, have lead to the development of various coding techniques to reduce such redundancy, thereby eliminating the wasted transmission time. One such coding technique is known as run length coding in which binary numbers corresponding to various blocks of video data are sent rather than the usual facsimile signals. In such a system, a binary number of relatively few bits may be sent in lieu of a larger block of video data.

Such encoding techniques, while significantly reducing the number of bits which must be sent and thereby reducing the transmission time, have not been entirely satisfactory. A first shortcoming involves the delay in generating the encoded signals because the various lines of a document generally contain various amounts of information. Further complications arise relating to the positioning of the scanning apparatus relative to the document to be scanned and the synchronous operation thereof.

As is known in the art, in any facsimile system, such system parameters as the scanning rate, the number of scan lines per unit length of an original document and the transmission medium bandwidth capabilities determine the obtainable resolution in the reproduced facsimile copy.

It is, therefore, an object of the present invention to provide methods and apparatus for facilitating the efficient utilization of the bandwidth capabilities of transmission systems in graphic communication systems.

It is another object of the present invention to optimize the information handling capability of transmission networks in graphic communication systems.

It is another object of the present invention to reduce the cost of operating the transmission link in a graphic communication system.

It is yet another object of the present invention to provide an improved high speed image exploring device for graphic communication systems.

In accomplishing the above and other desired aspects applicant has invented a novel method and apparatus for increasing the transmission link efficiency by more fully utilizing bandwidth capabilities of the transmission meda interconnecting the transmitter and receiver in a graphic communication system. In accordance with the first aspect of the present invention, a plurality of lines of a document to be transmitted are successively scanned intermediate relative translatory motion between scanning apparatus and a document to be scanned. Each of the plurality of groups is scanned in a similar raster type sweep at a rate sufficient to generate information signals in excess of the bandwidth capabilities of the transmission media.

The information signals thus generated are first encoded to reduce signal redundancy and are then fed to a memory register in which the serially generated signals are converted into blocks of information with the bits in each group being available in parallel. The output from the memory representing sequential blocks of information is fed to a line store memory as groups or blocks of data. The coded information groups are fed from the line store memory to an input terminal of the communication link at a rate compatible with the bandwidth capabilities of the transmission media. Control apparatus, which is responsive to the information content of the line store memory, selectively controls the initiation of each scan and the incremental relative translatory motion between the scanner apparatus and the document to be scanned, thus facilitating the scanning of a plurality of lines with the document and scanning apparatus in a fixed position and the periodic indexing of the scanning apparatus and document between the scanning of adjacent groups of lines in the raster type sweep.

In operation, by scanning the original document and thus generating facsimile signals at a rate in excess of the bandwidth capabilities of the transmission media, a continuous coded stream of information, in which the signal redundancy has been considerably reduced, is available for transmission at a rate near the maximum rate compatible with the communication link regardless of the compression ratio for each individual line. With the positioning and actuation of the scanning means being responsive to a predetermined informational content of the line store memory, the generation of the coded signals is controlled as a function of the compression ratio factor for each line segment of the particular document being scanned. Thus, overflow conditions, in which more information than the line store can handle, is avoided and signals at a rate compatible with the bandwidth capabilities of the transmission link are forward from the transmitter to the receiver, thereby fully utilizing the capabilities of the communication network.

For a more complete understanding of the invention, as well as other objects and further features thereof, reference may be had to the following detailed description in conjunction with the drawings wherein.

Figure 1:
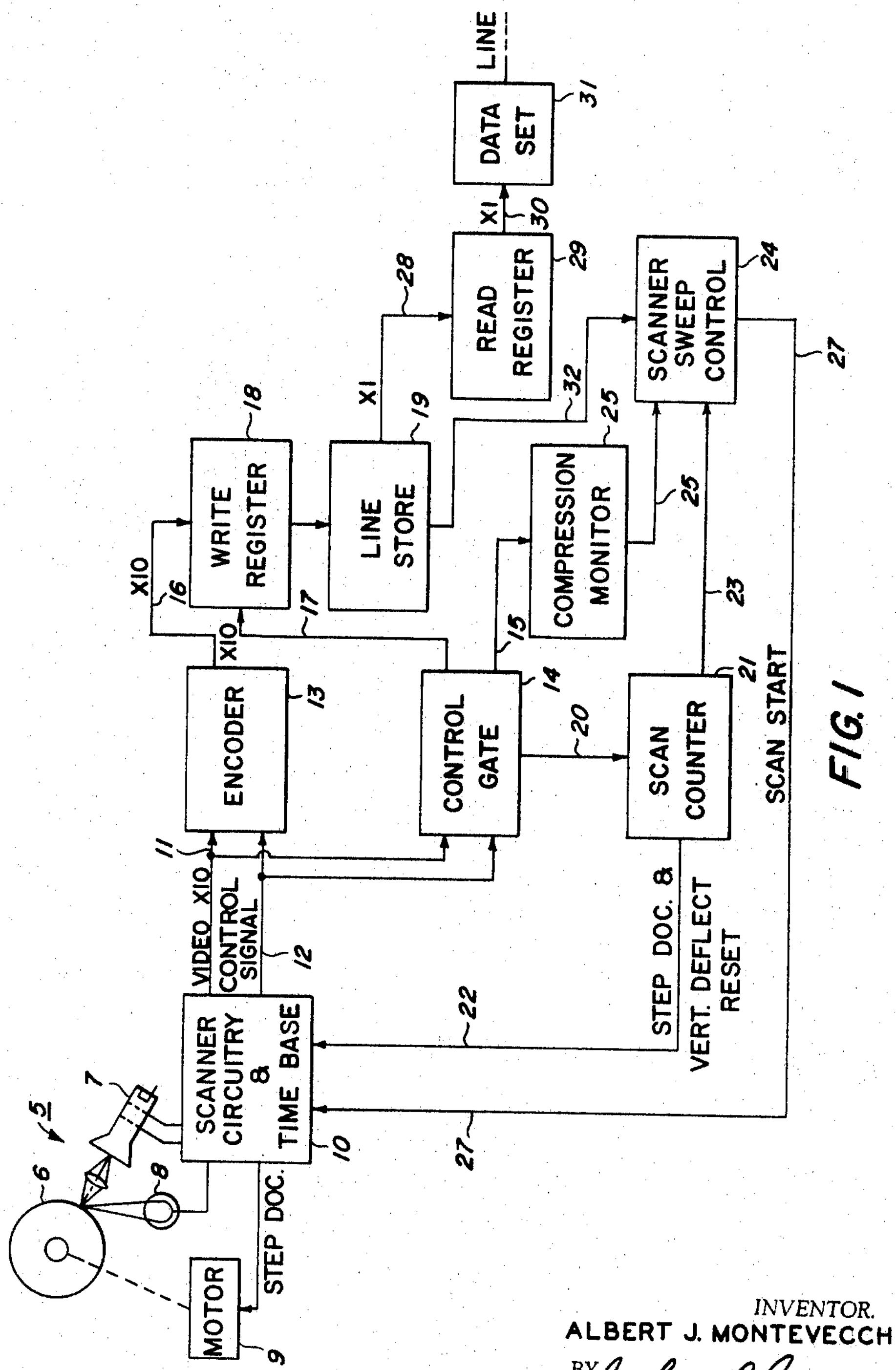
FIG. 1 is a block diagram of a facsimile transmitter station in accordance with the principles of the present invention.

Referring now to FIG. 1, there is shown a facsimile transmitter embodying the principles of the present invention. The document to be scanned and transmitted via the facsimile system is positioned on a rotatably supported drum 6 by any means, not shown. The rotation of the drum brings successive areas of the document under the image exploring device 5 and, as hereinafter will be more fully explained, successive groups of lines of the document are scanned intermediate successive incremental steps of the drum under the influence of motor 9. The rotation of the drum brings successive areas of the document under the image exploring device 5 and the varying intensity reflected light signals corresponding to the scanned information is focused by lenticular means, not shown, onto a detector 8, which may comprise a photoelectric cell.

In accordance with the first aspect of the present invention, information on the document to be transmitted is converted into electrical signals by the image exploring device at a rate substantially higher than that rate which can be utilized by the transmission link interconnecting the transmitter and receiver. For example, if the transmission link comprises a Bell Telephone Telpak A service which has a bandwidth of approximately 50 kilocycles, the image exploring beam of the scanner would be operated at a rate sufficient to generate maximum information transitions at approximately 500 kilocycles, thus yielding a theoretical maximum compression factor of ten.

As shown, the image exploring device 5 may comprise a flying spot scanner including a cathode ray tube 7. As is known in the art, the beam of light is generated at the fluorescent screen in response to the impingement of an electron beam which is selectively deflected by appropriate horizontal deflection waveforms. In a manner hereinafter to be more fully explained, the electron beam of the CRT and thus the image exploring light source is deflected vertically under the control of scanner control circuit 10 a predetermined distance intermediate successive incremental advances of drum 6 by motor 9. The extent of the vertical deflection of the image exploring beam and thus the number of successive lines of the document scanned intermediate successive incremental advancements of the document is a function of the quality of the lenticular means associated with the flying spot scanner. For purposes of example, assume that the original document will be sequentially indexed a distance in the order of one-half inch and that the various lines of the document within the one-half inch increments will be scanned by deflecting the image exploring device on the cathode ray tube. After the last line of each group of lines has been explored in a raster type scan, the drum will again be indexed to position the next group of lines in a cooperable position relative to the scanning beam. This operation continues until the entire document has been scanned and, for an eleven inch document, this would be approximately 21 discrete steps at the one-half inch stepping rate.

As hereinabove stated, the operation of the image exporing device 5 is controlled by scanner control circuitry 10. The scanner control circuitry 10 may comprise a timing base generator for generating timing signals for controlling the selective operation of the image exploring device 5 and the actuation of incremental stepping motor 9. In addition, control circuit 10 includes conventional amplifier means which, in response to analog signals from light responsive detector 8, generate digitalized or amplitude quantized binary video signals. Further, the control circuit at time base generator 10 includes, as will hereinafter be more fully explained, logical means for generating synchronizing signals and means for selectively inserting such synchronizing signals into the video train during the dead or flyback time of the scanner retrace.

The video information in the form of binary pulses from scanner control 10 obtained at the 10× rate, i.e., ten times faster than the transmission link bandwidth capabilities, passes over line 11 to encoder 13. After the encoding of the signals denoting one scan line, to remove the redundancy therein, the information passes over line 16, still at the 10× rate, to serial-parallel write register 18 for subsequent storage at line store 19, which could be a logical shift register. As soon as the video signals are available at line store 19, the transmission thereof at the 1× rate, i.e., at a rate compatible with and near the predetermined maximum bandwidth of the transmission line, begins via line 28 and parallel to serial read register 29 to data set 31 and subsequently to the line. The read and write registers may consist of logical shift registers to allow for such serial-to-parallel conversion, or vice versa, as is necessitated by the system. When line store 19 has been partly unloaded to the transmission medium by a predetermined percentage, which, for this example will be 90%, a signal is sent over line 32 to the scanner sweep control 24. When this signal is received at the scanner sweep control 24, a scan start signal is sent back to the scanner control 10 over line 27 to allow the start of the scanning of the next successive line. The data sets 31 and 50 at the transmitter and receiver, respectively, are the transmission terminals of the system and may be a conventional line driver or a frequency shift keyer. They are provided to allow compatibility between the scanner and receiver circuits and the transmission system.

As the second line is scanned, the data will be encoded and stored at the line store 19 before the first line data has been completely transmitted; therefore, the line store will be filling up at a 10× rate and intermittently emptying at a 1× rate. As long as the scanning of the second scan line is approximately delayed, i.e., does not start until the store is at least $\frac{9}{10}$ empty, no data overlap condition will occur.

The encoder 13 compresses the input video by reducing or encoding the redundant information detected therein. Such an encoder may be, for example, of the run-length type, wherein the redundant lengths of similar information are counted and encoded in a predetermined pattern. Thus, long runs of binary 1 or binary 0 information will not be transmitted but only the encoded pattern that represents such information. For further disclosure and operation of a similar encoder and decoder, reference may be made to U.S. Patent No. 2,963,551.

Due to the fact that the encoded length of a line will not be the same for every scanned line, as successive lines will not generally have the same information, there must be a control or sync word added to each scanned line so that the receiver will be able to detect the beginning and end of the line. In this 'adaptive" mode there is no set time interval for sync to occur; therefore, a unique, i.e., identifiable sync character is generally required. With bandwidth or bit compression, this is possible because every compression method has certain binary bit patterns which cannot occur in the compressed video stream.

At scanner control 10, a control signal will be generated by a clock pulse from the internal time base. This clock pulse, which is used to keep the system in synchronization, will energize a sync word generator within the scanner to form a unique or identifiable sync word. Such generators may comprise a plurality of preset flip-flops to form such a unique sync word when pulsed. This sync word will be added to the video pulse train between the data output for each line. By line 12, the output control signal will block the encoder from receiving the video train from the scanner 10 while opening control gate 14. The control signal, which is as long as the sync word, thus allows only the sync word on line 11 to pass through control gate 14 to line store 19 without being encoded. Control gate 14 may consist of conventional logic flip-flops and gating circuitry, which for simplicity, is shown only as gate 14.

In order to prevent a data pileup at the line store 19 and the receiver, the overall compression of the system cannot exceed a predetermined factor, which has been stated to be, for purpose of example, 10:1. If, however, the encoder for a particular document had a greater than 10:1 bit reduction for the first line, the signal to start the scanning of the second line would not be generated immediately upon completing the transmission of the first line but would be delayed long enough so that the average compression of the first line is 10:1.

After operation of control gate 14, the control signal, on line 15, pulses the compression monitor 25, which is essentially a counter. If it is assumed that the compression is to be limited to a maximum factor of 10:1, and that a scan line would have a possible maximum of 1664 bits, then the compression monitor 25 would count to 166 before emitting a signal to scanner sweep control 24, on line 26. Thus, if the particular line scanned has a compression factor greater than 10:1, or less than 166 bits, then the signal output from the compression monitor 25 will delay the signal to the scanner sweep control 24 until the full 166 bits have been counted. This will produce short dead spaces in the transmission which must be present to keep the compression factor at a maximum of 10:1, or else there would be a data pileup both at the receiver, which is also operating at the 10× rate, and the scanner line store 19. The compression monitor unit 25 may comprise a counter of conventional design which, upon reaching the desired count, emits an output signal and resets itself.

If the encoding method gives a bit reduction of 10:1 or less with the particular encoder used, then the signal to start the scanning of the second line will be generated as soon as the store is $\frac{9}{10}$ empty, i.e., ninety percent of the information capacity is empty or the predetermined number of bits per line, i.e., the ratio of the maximum number of bits per line to the maximum compression ratio has been completely transmitted, whichever occurs first. In this case, there will be no dead spaces in the transmission because the compression is not greater than 10:1 and the receiver can keep up.

As previously stated, scanner sweep control 24, which may comprise logic circuitry of conventional design, initiates a scan start signal along line 27 to allow scanner control 10 to initiate the scanning of the next line. However, at the end of a predetermined number of lines scanned, which is equivalent to the distance along the document which has been scanned, the scan must be interrupted to allow the drum to step the document to the next scan position. The control gate 14, which has previously been described, steps the scan counter 21, by line 20, and after the predetermined amount of lines have been scanned, the scan counter 21 will initiate a signal on line 22 to scanner control 10 to step the document to the next scan position by means of motor 9 and to vertically reset the beam deflection at the scanner. The counter 21 may comprise any logical flip-flop circuitry known in the art.

The one-half inch step interval is given as an example and it is to be understood as illustrative and not limiting. Larger or shorter steps to be taken by the drum and document may be made depending upon beam length, optical resolution of the beam, and the actual apparatus initiating the beam. The larger the step that is taken, the more difficult it is to get the same quality picture, because the beam striking the drum comes in at a greater angle which tends to distort the information, as has been hereinbefore mentioned. Other distances, as three-quarters inch or one inch, could possibly be used before the distortion becomes objectionable; however, this depends upon the above factors. The larger and thus the fewer steps that are taken, the better the overall compression because the total time required while the document and drum are stepped is less. However, assuming one-half inch step intervals at 190 lines per inch resolution, the document and drum would receive a step command from the scan counter 21 every ninety-five scan lines. On the start of the ninety-fifth scan line, the scan counter 21 inhibits the sweep control 24 from initiating a scan start signal until the document and drum 6 have been stepped and are ready to be scanned again.

Figure 2:
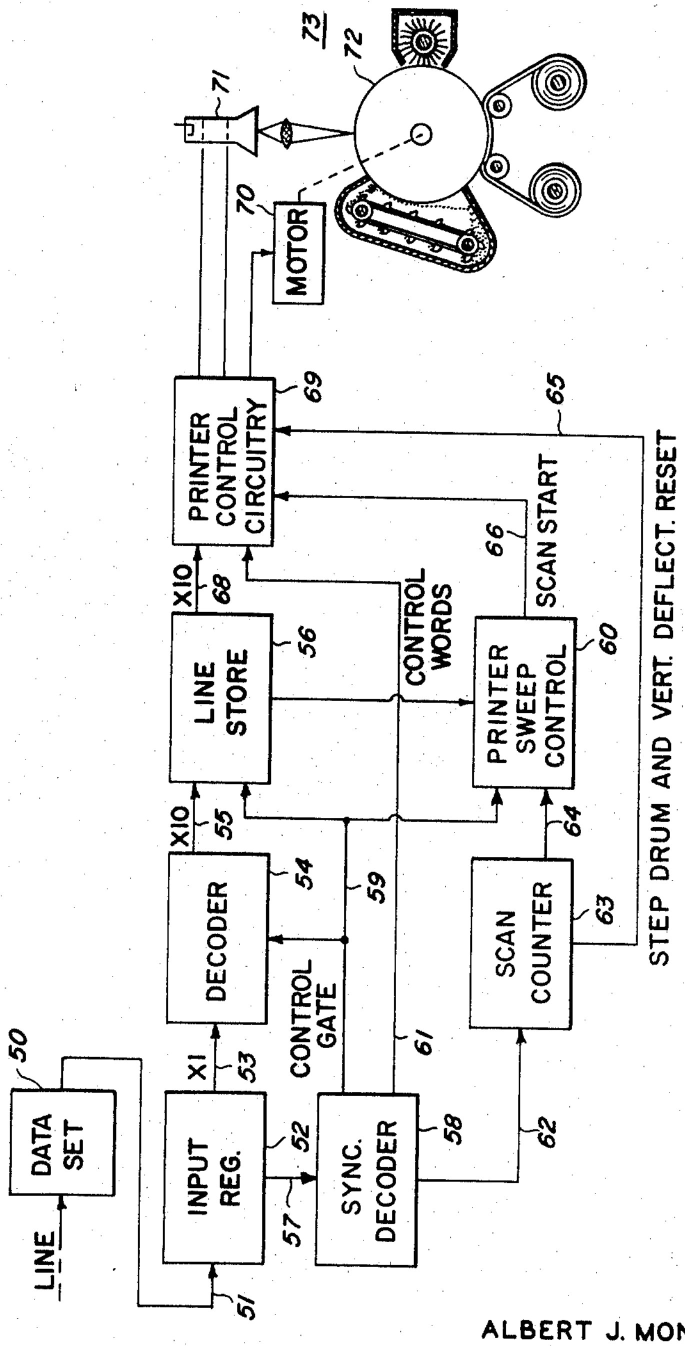
FIG. 2 is a block diagram of a facsimile receiver station compatible with the transmitter shown in FIG. 1.

Referring now to FIG. 2, a facsimile receiver compatible with the transmitter illustrated in FIG. 1 is shown. The combined video information signals and synchronizing signals from the transmission line are received by data set 50 and are forwarded, by line 51, to input register 52. The information output on line 53 from the register 52 is at the 1× rate and is decoded by decoder 54. The information output from decoder 54 is the decompressed binary information signal train now at the 10× rate. These information signals are coupled by line 55 to line store 56. Actual writing on the drum 72 at printer 73 is preferably delayed until the data for one complete line has been stored in the line store 56. After one complete line has been received at the input register 52, the next series of binary information is the sync word which is detected at the sync decoder 58 and, by line 59, is sent to line store 56. Upon receipt of the control sync gate signal at line store 56, the information representing one scanned line is then passed serially at the 10× rate by line 68 to control the actuation of the printer 73.

Printer 73, as shown, may comprise a flying spot scanner including a CRT similar to the type employed in the transmitter illustrated in FIG. 1. The electron beam of the CRT in the printer is selectively gated on in response to the received video signals, thus generating an information modulated source of light rays for selectively illuminating elemental portions of the light responsive photoreceptor surface of a xerographic printer. For a complete understanding of a xerographic facsimile printer, reference may be had to U.S. Patent No. 3,149,201, issued Sept. 15, 1964, to C. L. Huber et al. It is to be understood, however, that the xerographic facsimile printer is illustrative only and other types of facsimile printers known in the art may be employed in practicing the present invention.

When the binary information is received at printer 73, a signal from the sync decoder 58 passes by line 62 to scan counter 63 to be counted, and by line 64, then is sent to printer sweep control 60. The output scan start signal thus initiated from the printer sweep control 60 by line 66 directs the printer 73 to begin scanning under the control of information serially read out of the line store 56. Delaying the printing until a complete line of information is stored at line store 56 insures a continuous data flow to the drum 72 for each scan line once the scan has started. The printer line store 56 operates similarly to the scanner line store 19 of the transmitter in that new data comes into store 56 before the previous line data has been completely transferred to the printer control; but as long as the scanner system holds the maximum compression within the ratio of 10:1, no data overlap will occur in the receiver line store 56. Since the printer drum 72 is not moving during print out, the writing beam from cathode ray tube 71 is deflected vertically for each successive scan line of data under the control of the signal from the sync decoder 58 over line 61 to the printer control 69 for each line within a predetermined number of lines.

After a predetermined number of lines, scan counter 63 has counted the requisite number and amount drum step signal and a vertical deflection reset signal is sent over line 65 to the printer control 69 to halt the scanning and reset the scanner beam position to the original position and step the drum by means of motor 70 to the next scan position.

The time required for stepping the document and the drum affects the system compression to a small degree but the loss in efficiency is not excessive because of the reduced number of steps required per document. For instance, if it is desired to transmit over the Bell Telephone lines, utilizing a Telpak A link, with a scanning rate of 190 lines per inch and with the drum indexing or stepping at one-half inch increments, there would then be 21 discrete steps for an eleven inch document. Assuming fifty milliseconds per index step, there would be a total step time per document of 1050 milliseconds. This entire 1050 milliseconds is not unused for when the step starts there is still one scan line of data in storage which is to be transmitted while the document is being stepped. Therefore, one scan time is to be subtracted for each step. For transmission at 50 kilocycles, the scanner is operated at a 500 kilocycle rate; therefore, each scan time in this example requires 3.33 milliseconds. So, of the 1050 milliseconds of step time, seventy milliseconds is utilized as transmitting time, leaving 980 milliseconds that the system is held up due to the required stepping feature. This 980 milliseconds assumes 10:1 compression.

To compute actual compression efficiencies for the system, there has to be assumed different bit compressions for individual documents. Thus, the bit transmission time must be added to the fixed step time of 980 milliseconds. For example, assuming an average bit reduction in the example of 10:1 for a document scanned at 190 lines per inch, the total time to transmit the document would be 3.33 milliseconds per scan times 2090 lines per eleven inch page plus 980 milliseconds. This comes to 7.94 seconds per document transmission or about 7.5 documents transmitted per minute. Without compression and at the 190 lines per inch rate, there would be approximately 0.9 document transmitted per minute. Thus, the maximum upper compression factor limit for this system is about 8.8:1. This is, of course, assuming that the compression efficiency of the encoder and decoder is approximately 6:1.

In the foregoing there has been disclosed an improved method and apparatus for optimizing the utilization of the bandwidth capability of a transmission link in a facsimile transmission system. While the parameters used for purposes of example in the previous paragraphs are valid figures, other scan times, compression rates, numbers of scanned lines, etc., may be used by one skilled in the art while still retaining the advantages of the present invention. Thus, while the present invention, as to its objects and advantages, as described herein, has been set forth in a specific embodiment thereof, it is to be understood to be illustrative only and not to be limiting. It is intended, therefore, to be limited only as indicated by the scope of the appended claims.

What is claimed is:

1. In a graphic communication system the combination comprising:

- scanning means for selectively scanning from a starting position in a sequential order a first plurality of lines on a document along a predetermined raster to form binary pulse waveforms at an information rate in excess of the bandwidth capability of a transmission medium representative of the information content of each line of said first plurality of lines on said document,
- coding means for coding said binary pulse waveforms derived from each line of said first plurality of lines into successive coded signals of lesser redundancy than said binary pulse waveforms,
- buffer storage means for storing the successive portions of said coded signals,
- means for generating a distinguishable sync word,
- means for inserting said sync word between the successive portions of said coded signals,
- detecting means for determining an encoded compression factor of each scan line of coded signals relative to a maximum compression factor,
- control means responsive to said detecting means for delaying the initiation of scanning of each successive scan line until the compression factor of each preceding line has reached a predetermined maximum,
- means for determining the scanning termination of the last line of said first plurality of lines,
- advance means responsive to said last mentioned means for advancing the document a predetermined distance and for resetting said scanning means to the starting position for scanning successive like pluralities of lines, and
- means for transmitting said coded signals at a rate compatible with the maximum bandwidth capability of the transmission medium to a receiver to recreate a facsimile of said document.

2. In a graphic communication system wherein the video information is generated, encoded, and transmitted at rates respectively in excess of and compatible with the maximum bandwidth capability of the transmission medium, a receiver comprising:

- decoding means for decompressing said encoded video information into binary pulse waveforms representative of the information on an original document,
- buffer storage means for storing successive portions of said binary pulse waveforms,
- means for detecting a distinguishable sync word occurring between said successive portions of said binary pulse waveform,
- marking means adjacent to a readout medium for scanning selective elemental areas of a first plurality of lines on said readout medium along a predetermined raster and in response to said binary pulse waveforms for recreating a facsimile of said document at a rate in excess of said maximum bandwidth capability of said transmission medium,
- control means for controlling the start of the scanning of successive scan lines,
- means for determining the scanning termination of the last line of said plurality of lines, and
- advance means responsive to said last mentioned means for advancing the readout medium a predetermined distance and for resetting said marking means to the original scan position for scanning successive like pluralities of lines.

3. In a graphic communication system, the method of increasing the information transmission efficiency comprising the steps of

- positioning a scanning means adjacent to a document to be scanned,
- scanning selective elemental areas of a first plurality of lines on a document along a predetermined raster to form binary pulse waveforms representative of the information on said document at a rate in excess of the bandwidth capability of the transmission medium,
- coding said binary pulse waveform into coded signals to reduce the redundancy of said binary pulse waveform,
- storing successive portions of said coded signals, repositioning said scanning means relative to said document for scanning successive like pluralities of lines,
transmitting said coded signals at a rate compatible with the maximum bandwidth capability of the transmission medium to a receiver to recreate a facsimile of said document and
selectively delaying the initiation of scanning of succeeding line segments of each of said pluralities of lines for timing intervals respectively dependent upon the ratio of the encoded compression factor of the immediately preceding line to a predetermined system maximum compression factor.

4. In a graphic communication system, the improved method of receiving video information that was generated and encoded at rates respectively in excess of and transmitted at information bit rates compatible with the maximum bandwidth capability of the transmission medium, comprising:
decoding said encoded video information signals into decompresed binary pulse waveforms representative of the information on a document,
storing successive portions of said binary pulse waveform,
positioning a marking means adjacent to a recording medium in a starting position,
selectively deflecting said marking means on selective elemental areas of a first plurality of lines on said recording medium along a predetermined raster,
actuating said marking means in response to said binary pulse waveforms at a rate in excess of said maximum bandwidth capability of the transmission system to recreate a facsimile of said document, and
repositioning said marking means for scanning a second like plurality of lines while simultaneously imparting a relative translatory motion to said recording medium in response to the detection of the termination of the scanning of the last succeeding line of said plurality.

5. In a graphic communication system, the method of increasing the information transmission efficiency comprising the steps of
positioning a scanning means adjacent to a document to be scanned,
scanning selective elemental areas of a first plurality of lines on said document along a predetermined raster to form binary pulse waveforms representative of the information on said document at a rate in excess of the bandwidth capability of the transmission medium,
coding said binary pulse waveform into coded signals to reduce the redundancy of said binary pulse waveform,
storing successive portions of said coded signals,
repositioning said scanning means relative to said document for scanning successive like pluralities of lines,
detecting the maximum encoding compression factor of each scanned line,
delaying the initiation of scanning of each successive line when said maximum encoding compression factor for the next preceding line is in excess of a predetermined maximum,
imparting relative motion between the document and said scanning means for cooperably juxtapositioning the next like plurality of lines after determining the last line of said first plurality of lines, and
transmitting said coded signals at a rate compatible with the maximum bandwidth capability of the transmission medium to a receiver to recreate a facsimile of said document.

6. A facsimile transmitter comprising:
scanning means for sequentially scanning each of a plurality of similar line segments of a document to be transmitted and for generating electric video signals related to the document reflectivity along each of said line segments at an information bit rate substantially in excess of the bandwidth capability of a transmission link operatively associated with said transmitter,
advance means for incrementally indexing said scanning means relative to the document to be scanned upon the termination of the scanning of the last line segment of each plurality to position the next successive group of like plurality of similar line segments in cooperable juxtaposition with said scanning means,
encoding means for serially generating coded waveforms of reduced redundancy corresponding to the video signals,
memory means for storing said serially generated coded waveforms and for converting said serially coded waveforms into successive groups of information blocks available in parallel,
compression monitor means for monitoring the compression ratio of the video waveform corresponding to each line segment of said document, and
means for transferring information bits of said successive blocks of encoded waveforms to said transmission link at an information rate compatible with the bandwidth capability of said transmision link.

7. The transmitter defined in claim 6 additionally including:
sweep control means responsive to said compression monitor means and a basic timing signal means for controlling the initiation of the scanning of each similar line segment, and
synchronizing means for generating a synchronizing signal and combining said synchronizing signal into the video waveform coupled to said transmission link during each retrace or flyback time of said scanning means.

8. A facsimile transmitter comprising:
scanning means for sequentially scanning each of a plurality of similar line segments of a document to be transmitted and for generating electric video signals related to the document reflectivity along each of said line segments at an information bit rate substantially in excess of the bandwidth capability of a transmission link operatively associated with the transmitter, said scanning means comprising means for generating a point source of light rays for selectively illuminating a predetermined portion of the area of a document to be scanned, first means for deflecting the light rays in a substantially straight line in a predetermined direction, second means for selectively deflecting the light rays a predetermined amount in discrete steps in a direction substantially perpendicular to said predetermined direction, and means for selectively delaying the actuation of said first means for a timing interval in conformance with the transmission rate compatible with the bandwidth capability of the transmission link,
advance means for incrementally indexing said scanning means relative to the document to be scanned upon the termination of the scanning of the last line segment of each plurality to position the next successive group of like plurality of similar line segments in cooperable juxtaposition with said scanning means,
encoding means for serially generating coded waveforms of reduced redundancy corresponding to the video signals,
memory means for storing said serially generated coded waveforms and for converting said serially coded waveforms into successive groups of information blocks available in parallel, and
means for transferring information bits of said successive blocks of encoded waveforms to said transmission link at an information rate compatible with the bandwidth capability of said transmission link.

9. The transmitter defined in claim 8 wherein said advance means includes stepping motor means for imparting relative rotational movement between a rotatably supported document drum and said scanning means intermediate the scanning of the last line segment of one group of similar line segments of a document and the initiation of the scanning of a first line segment of the next successive group of similar line segments and additionally including means for resetting said first and second means to a reset or start position.

10. The transmitter defined in claim 8 wherein said scanning means further includes:

a cathode ray tube having a fluorescent screen, means for generating an electron beam, means for deflecting the electron beam in a first direction, and means for deflecting the electron beam in a second direction normal to said first direction, first means for generating a control waveform for deflecting the beam in said first direction on said screen, second means for generating a second control waveform for deflecting said beam in said second direction on said screen, and sweep control means responsive to the compression ratio of the immediately preceding line segment of said document and a basic timing signal for selectively delaying the actuation of said second means for a timing interval proportional to a predetermined function of the maximum compression ratio and the compression ratio of the immediately preceding line.

References Cited

UNITED STATES PATENTS

| | | | |
|---|---|---|---|
| 3,061,672 | 10/1962 | Wyle | 178—7.1 |
| 3,344,231 | 9/1967 | Dodd et al. | 178—7.1 |
| 3,324,237 | 6/1967 | Cherry et al. | 178—6 |

ROBERT L. GRIFFIN, Primary Examiner

RICHARD K. ECKERT, Jr., Assistant Examiner

U.S. Cl. X.R.

179—2, 15.55